United States Patent [19]

Himori

[11] Patent Number: 5,162,444
[45] Date of Patent: Nov. 10, 1992

[54] FLUORINE-CONTAINING AB-TYPE BLOCK COPOLYMER

[75] Inventor: Shunichi Himori, Yokkaichi, Japan

[73] Assignee: Mitsubishi Petrochemical Company Limited, Tokyo, Japan

[21] Appl. No.: 616,750

[22] Filed: Nov. 21, 1990

Related U.S. Application Data

[63] Continuation of Ser. No. 192,525, May 11, 1988, abandoned.

[30] Foreign Application Priority Data

May 13, 1987 [JP] Japan ................................. 62-116144
Jul. 2, 1987 [JP] Japan ................................. 62-165903

[51] Int. Cl.$^5$ ............................................. C08F 2/46
[52] U.S. Cl. ..................... 525/276; 525/259;
525/261; 525/267; 522/57; 522/124
[58] Field of Search ................. 522/57, 124; 525/259,
525/261, 267, 276

[56] References Cited

U.S. PATENT DOCUMENTS 2,423,520  7/1947  Richards ................. 522/57
3,069,380  12/1962  Nozaki ................... 522/124

FOREIGN PATENT DOCUMENTS 0161804  11/1985  European Pat. Off. ............ 525/276

OTHER PUBLICATIONS

Otsu, T. "Living radical polymerization in homogeneous system by using iniferter" J. Macromol. Sci.-Chem A 21, pp. 961-977 (1984).

J. Macromol. Sci-Chem. A21(849), pp. 961-977 (1984) Otsu, T. et al. "Living Radical Polyerization—Design of Block copolymers".

Primary Examiner—Ana L. Carrillo
Assistant Examiner—Vasu S. Jagannathan
Attorney, Agent, or Firm—Oblon, Spivak, McClelland, Maier & Neustadt

[57] ABSTRACT

An AB type-block copolymer of the formula:

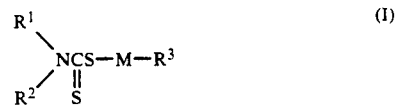

wherein $R^1$ is a hydrocarbon group having 1 to 10 carbon atoms; $R^2$ is a hydrogen atom or a hydrocarbon group having 1 to 10 carbon atoms; $R^3$ is a benzyl group, an alkyl group having 1 to 18 carbon atoms or

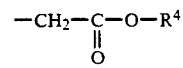

wherein $R^4$ is an alkyl group having 1 to 18 carbon atoms; M represents a fluorine-containing AB-type block copolymer having a fluorine-containing polymer chain and a polymer chain having affinity for a resin.

14 Claims, No Drawings

FLUORINE-CONTAINING AB-TYPE BLOCK COPOLYMER

This application is a continuation of application Ser. No. 07/192,525, filed on May 11, 1988, now abandoned.

BACKGROUND OF THE INVENTION

This invention relates to a fluorine-containing AB-type block copolymer having a fluorine-containing polymer chain and a polymer chain having affinity for a resin.

It has been already known that a block copolymer is useful for modifying the surface or interface of a resin and making its effect persistent.

The fluorine-containing AB-type block copolymer of the present invention functions in such a manner that the fluorine-containing polymer chain is oriented to the surface or interface of the resin to be modified, while the polymer chain having affinity for a resin is fixed to the resin. Accordingly, it can be used in various fields in which excellent properties possessed by fluorine atoms such as corrosion resistance, water resistance, solvent resistance, chemical resistance, non-tackiness, peeling characteristic, low frictional characteristic, low abrasion, staining resistance, water repellency, oil repellency, weathering resistance, heat resistance, biological compatibility, etc. are desired to be imparted to a resin. Specifically, it can be used as a paint additive, resin additive, peeling agent, mold release agent, a water repellent, oil repellent or surfactant.

An attempt has heretofore been made to synthesize fluorine-containing block copolymers which are expected to have the above mentioned excellent surface or interface modification effect, but has not been successful with radical polymerization methods. Meanwhile, Japanese Laid-Open Patent Publication No. 221410 has proposed that a block copolymer containing a (per)-fluoroalkylene group or (per)fluoroalkyl group can be synthesized by use of a polymeric peroxide or a polyazo compound.

However, when a fluorine-containing block copolymer is synthesized by the use of a polymeric peroxide or polyazo compound as mentioned above, the molecular weight of the resulting polymer can be controlled with difficulty and further homopolymers are by-produced whereby it is difficult to obtain a block copolymer of high purity.

SUMMARY OF THE INVENTION

An object of the present invention is to solve the above problems. The present inventor has found that a fluorine-containing AB-type copolymer having a fluorine-containing polymer chain and a polymer chain having affinity for a resin in combination can impart various excellent properties possessed by fluorine atoms such as water repellency, oil repellency and staining resistance to the surface or interface of the resin to be modified, and also the effects are permanent, thereby accomplishing the present invention.

More specifically, the fluorine-containing AB-type block copolymer is represented by the following formula (I):

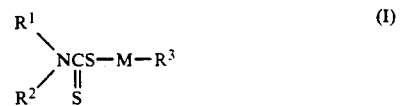

wherein $R^1$ represents a hydrocarbon group having 1 to 10 carbon atoms; $R^2$ represents a hydrogen atom or a hydrocarbon group having 1 to 10 carbon atoms; $R^3$ represents a benzyl group,

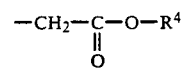

(wherein $R^4$ represents an alkyl group having 1 to 18 carbon atoms) or an alkyl group having 1 to 18 carbon atoms; M represents a group represented by the formula $(M^2)_m(M^1)_n$ or $(M^1)_m(M^2)_n$, each of m and n being a natural number of 20 to 5000; $M^1$ represents a (meth)acrylate residue represented by the formula:

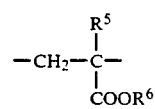

(wherein $R^5$ represents a hydrogen atom or a methyl group, and $R^6$ represents a hydrocarbon group having 1 to 18 carbon atoms or a hydrocarbon group having 1 to 18 carbon atoms substituted with an alkoxy group or a hydroxyl group) or an aromatic vinyl residue represented by the formula:

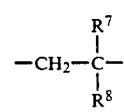

(wherein $R^7$ represents a hydrogen atom or a methyl group, $R^8$ represents a phenyl group or an alkylphenyl group) or a fatty acid vinyl ester residue represented by the formula:

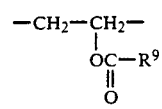

(wherein $R^9$ represents a hydrocarbon group having 1 to 18 carbon atoms); $M^2$ represents a fluorine-containing vinyl residue represented by the formulae (II) to (VI);

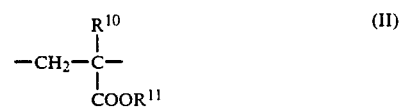

wherein $R^{10}$ represents a hydrogen atom, a methyl group, a fluorine atom or a fluorine-substituted alkyl group having 1 to 16 carbon atoms, and $R^{11}$ represents a fluorine-substituted alkyl group having 1 to 16 carbon atoms,

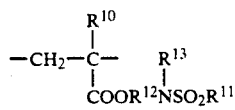

(III)

wherein $R^{10}$ and $R^{11}$ have the same meanings as those in the formula (II), $R^{12}$ represents an alkylene group having 1 to 10 carbon atoms and R3 represents an alkyl group having 1 to 10 carbon atoms,

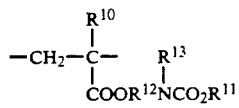

(IV)

wherein $R^{10}$, $R^{11}$, $R^{12}$, $R^{13}$ have the same meanings as those in the formula (III),

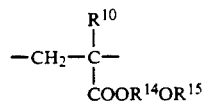

(V)

wherein $R^{10}$ have the same meaning as that in the formula (IV), $R^{14}$ is an alkylene group having 1 to 10 carbon atoms or a fluorine-substituted alkylene group having 1 to 10 carbon atoms, $R^{15}$ is an alkyl group having 1 to 10 carbon atoms or a fluorine-substituted alkyl group having 1 to 10 carbon atoms; at least one of $R^{10}$, $R^{14}$ and $R^{15}$ being required to contain fluorine,

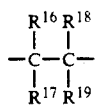

(VI)

wherein $R^{16}$, $R^{17}$, $R^{18}$, $R^{19}$ each represent a hydrogen atom, a chlorine atom, a fluorine atom, a phenyl group, a substituted phenyl group, a fluorine-substituted alkyl group having 1 to 6 carbon atoms, at least one of $R^{16}$ to being required to contain fluorine.

DETAILED DESCRIPTION OF THE INVENTION

The residue contained in the formula (I) herein means recurring units of a monomer having vinyl group which have been bonded by addition polymerization.

The fluorine-containing AB-type block copolymer according to the present invention has a structure that a fluorine-containing polymer chain and a polymer chain having affinity for a resin to be modified are chemically bonded in a straight chain.

When a composition is formed by compounding such AB block copolymer with a resin to be modified by means of, for example, melt kneading, it will take a morphology in which the free energy of such composition system as a whole becomes the minimum and therefore the fluorine-containing polymer chain will be orientated to the surface or interface of the resin, while the resin-affinitive polymer chain will play a role to fix the polymer firmly on the resin. Accordingly, the AB-type block copolymer modifies the surface or interface of the resin, and also easy bleed-out or easy peel-off of such AB-type block copolymer itself from the resin can be prevented.

Therefore, the fluorine-containing AB-type block copolymer of the present invention can impart various properties inherent in fluorine atoms onto the surface or interface of a resin, and also give permanency to such properties.

Monomers for forming the resin-affinitive polymer chain

The $M^1$ which forms the resin-affinitive polymer chain is a (meth)acrylic acid ester residue represented by the formula:

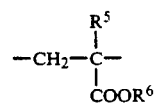

(wherein $R^5$ represents hydrogen atom or a methyl group, and $R^6$ represents a hydrocarbon group having 1 to 18 carbon atoms or a hydrocarbon group having 1 to 18 carbon atoms substituted with an alkoxy group or hydroxyl group).

Examples of monomers forming the (meth)acrylic acid ester residue may include (meth)acrylates such as methyl (meth)acrylate, ethyl (meth)acrylate, n-butyl (meth)acrylate, isobutyl (meth)acrylate, hexyl (meth)acrylate, isooctyl (meth)acrylate, 2-ethylhexyl (meth)acrylate, isononyl (meth)acrylate, decyl (meth)acrylate, stearyl (meth)acrylate, hydroxyethyl (meth)acrylate, 2-methoxyethyl (meth)acrylate, 2-ethoxyethyl (meth)acrylate, 2-butoxyethyl (meth)acrylate, (meth)acrylic acid pentaethylene glycol monomethyl ether, (meth)acrylic acid diethylene glycol monoethyl ether, (meth)acrylic acid diethylene glycol monobutyl ether and the like.

Alternatively, $M^1$ represents an aromatic vinyl residue represented by the formula:

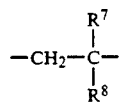

(wherein $R^7$ represents hydrogen atom or methyl group, and $R^8$ represents phenyl group or an alkylphenyl group).

Examples of the monomers for forming the aromatic vinyl residue may include styrene, p-methylstyrene, o-methylstyrene, α-methylstyrene, β-methylstyrene and the like.

Alternatively, $M^1$ represents an aliphatic vinyl ester residue represented by the formula:

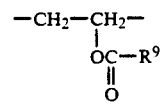

(wherein $R^9$ represents a hydrocarbon group having 1 to 18 carbon atoms).

Examples of monomers for forming the aliphatic vinyl ester residue may include vinyl acetate, vinyl propionate, vinyl butyrate, vinyl caproate, vinyl 2-ethylhexanoate, vinyl laurate, vinyl stearate, etc.

Fluorine containing vinyl monomers $M^2$ represents a fluorine-containing vinyl residue represented by the formulae (II) to (VI).

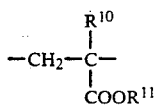

(wherein $R^{10}$ represents hydrogen atom, methyl group, fluorine atom or a fluorine-substituted alkyl group having 1 to 16 carbon atoms, and $R^{11}$ represents a fluorine-substituted alkyl group having 1 to 16 carbon atoms).

Examples of monomers for forming the fluorine-containing vinyl residue of the formula (II) may include:

$CF_3(CF_2)_7CH_2CH_2OCOCH=CH_2$, $CF_3(CF_2)_4CH_2CH_2OCOC(CH_3)=CH_2$, $CF_3CH_2OCOCH=CH_2$,

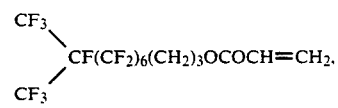

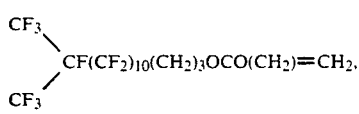

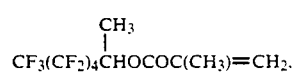

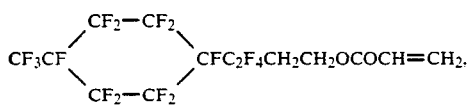

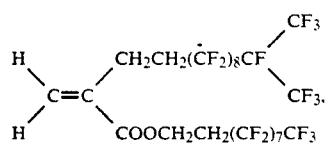

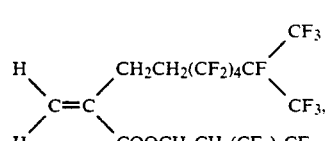

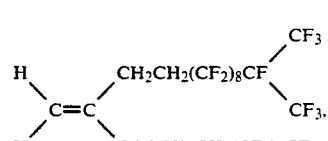

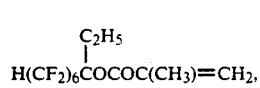

$H(CF_2)_8CH_2OCOCH=CH_2$, $H(CF_2)_4CH_2OCOCH=CH_2$, $H(CF_2)_6CH_2OCOC(CH_3)=CH_2$, $CF_3(CF_2)_8CFHCF_2CH_2OCH=CH_2$,

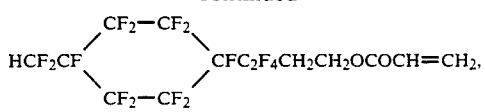

and the like.

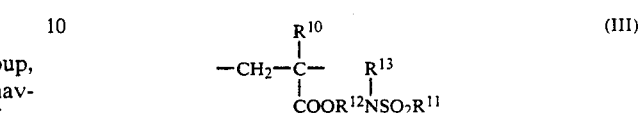

(wherein $R^{10}$ and $R^{11}$ have the same meanings as $R^{10}$ and $R^{11}$ in the formula (II), $R^{12}$ represents an alkylene group having 1 to 10 carbon atoms, and $R^{13}$ represents an alkyl group having 1 to 10 carbon atoms).

Examples of monomers for forming the fluorine-containing vinyl residue of the formula (III) may include:

$CF_3(CF_2)_7SO_2N(CH_3)CH_2CH_2OCOC(CH_3)=CH_2$, $CF_3(CF_2)_7SO_2N(CH_3)CH_2CH_2OCOCH=CH_2$,

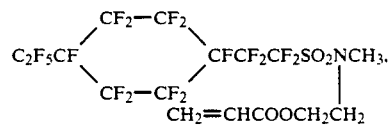

$C_8F_{17}SO_2N(CH_3)(CH_2)_{10}OCOCH=CH_2$, $C_2F_5SO_2N(C_2H_5)CH_2CH_2OCOC(CH_3)=CH_2$, $C_8F_{17}SO_2N(CH_3)(CH_2)_4OCOCH=CH_2$, $C_2F_5SO_2N(C_3H_7)CH_2CH_2OCOC(CH_3)=CH_2$, $C_2F_5SO_2N(C_2H_5)C(C_2H_5)HCH_2OCOCH=CH_2$,

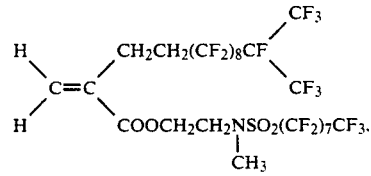

and the like.

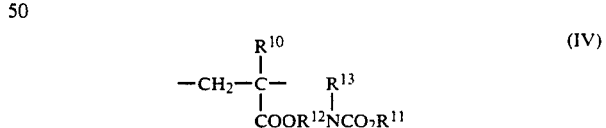

(wherein $R^{10}$, $R^{11}$, $R^{12}$ and $R^{13}$ have the same meanings as those in the formula (III)).

Examples of monomers for forming the fluorine-containing residue of the formula (IV) may include:

$C_7F_{15}CON(C_2H_5)CH_2OCOC(CH_3)=CH_2$, $C_2F_5CON(C_2H_5)CH_2OCOCH=CH_2$, $CF_3(CF_2)_2CON(CH_3)CH(CH_3)CH_2OCOCH=CH_2$, $CH_3(CF_2)_7CON(CH_2CH_2CH_3)CH_2CH_2OCOC(CH_3)=CH_2$,

-continued

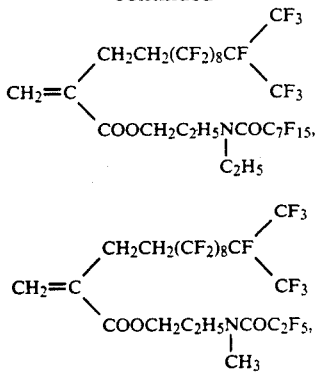

and the like.

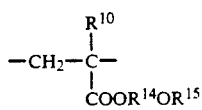

(wherein $R^{10}$ means the same meaning as that in the formula (IV), $R^{14}$ is an alkylene group having 1 to 10 carbon atoms or a fluorine-substituted alkylene group having 1 to 10 carbon atoms, $R^{15}$ is an alkyl group having 1 to 10 carbon atoms or a fluorine-substituted alkyl group having 1 to 10 carbon atoms; at least one of $R^{10}$, $R^{14}$ and $R^{15}$ being required to contain fluorine).

Examples of monomers for forming the fluorine-containing vinyl residue of the formula (V) may include:

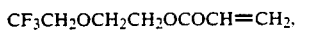
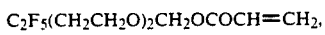
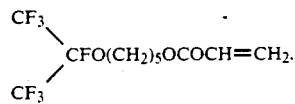
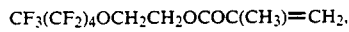
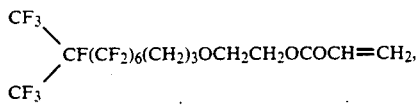
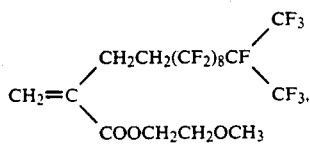

and the like.

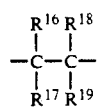

(wherein $R^{16}$, $R^{17}$, $R^{18}$, $R^{19}$ each represent hydrogen atom, chlorine atom, fluorine atom, phenyl group, a substituted phenyl group, a fluorine-substituted alkyl group having 1 to 6 carbon atoms, at least one of $R^{16}$ to $R^{19}$ being a fluorine-substituted group).

Examples of monomers for forming the fluorine-containing vinyl residue of the formula (VI) may inlcude: $CCl_2=CFCl$, $CFCl=CFCl$, $CF_2=CCl_2$, $CClF=CF_2$, $CF_2=CF_2$, $CHCl=CFCl$, $CHF=CCl_2$, $CHCl=CF_2$, $CHF=CClF$, $CHF=CF_2$, $CHF=CHCl$, $CH_2=CClF$, $CHF=CHF$, $CH_2=CF_2$, $CH_2=CFH$, $CF_2=C(CF_3)_2$, $CF_3—CF=CF_2$, $CF_3—CH=CHF$, $CF_3—CH=CH_2$, $C_3F_7(CH_3)C=CH_2$, $CF_{32}CF_2CF=(CF_3)$, $(CF_3)_2CFCF=CF—CF_3$, $$CH_2=CH-\phenyl-C_9F_{19},$$

and the like.

Specific examples of fluorine-containing monomers for forming the fluorine-containing polymer are as mentioned above, and at least one of these is used as a main component of the fluorine-containing vinyl polymer. Other fluorine-containing vinyl monomers or vinyl monomers than the above main component may also be used insofar as the modification effect of the block copolymer on the surface of a polymer material is to be exhibited.

Preparation of block copolymer

The block copolymer of the present invention is produced by block copolymerization, as follows.

According to a typical method, one of the monomer $M^1$ for forming the resin-affinitive polymer chain and the monomer $M^2$ for forming the fluorine-containing polymer chain is polymerized by the action of a radical polymerization initiator to form a polymer chain corresponding to the resin-affinitive polymer chain or the fluorine-containing polymer chain and having at the terminal end and free radical source comprising a free radical or a precursor (first step) and then polymerizing the other monomer with the free radical source (second step).

The radical polymerization initiator in this case should preferably have the functions of chain transfer and termination in combination. A specific example of such radical polymerization initiator is one which gives dithiocarbamate group to the terminal end of the polymer chain formed. The dithiocarbamate group formed at the terminal end of one block polymer chain is decomposed by giving light energy thereto to generate free radical, wherefrom formation of the other block is initiated.

The initiator preferably used in synthesis of the block copolymer according to the present invention, which has the functions of chain transfer and termination in combination in a radical polymerization process as set forth above, is called iniferter (Otsu, Kobunshi, 3, 222 (1984)). Specifically, it is a sulfur-containing compound and a typical example thereof is represented by the following formula (VII). The block copolymer can be synthesized by the use of one or more kinds of the compounds.

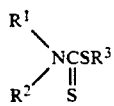 (VII)

(wherein $R^1$ represents a hydrocarbon group having 1 to 10 carbon atoms, $R^2$ represents hydrogen atom or a hydrocarbon group having 1 to 10 carbon atoms, and $R^3$ represents benzyl group,

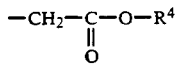

(wherein $R^4$ represents an alkyl group having 1 to 18 carbon atoms) or an alkyl group having 1 to 18 carbon atoms).

The hydrogen atom in $R^3$ may be substituted with a halogen, hydroxyl group, an alkoxyl group or carboxylic acid group, etc., unless the substitution remarkably changes the electronic state of the compound or remarkably increases the steric hindrance thereby lowering the ability of the compound as a radical polymerization initiator.

The compounds represented by the above formula have been generally used as reagents for rubbers, and can be synthesized with good yield from corresponding halides and dithiocarbamic acid salts. For example, N,N-diethylbenzyldithiocarbamate can be synthesized from benzyl bromide and sodium N,N-diethyldithiocarbamate.

In order for the compounds to function as the initiator through decomposition of themselves, to initiate the first step and the second step of block copolymerization, can be employed a UV-ray of wavelengths of 300 to 500 nm.

Copolymerization

As mentioned above, the block copolymer according to the present invention can be synthesized according to the following two steps.

First step: A first vinyl monomer is polymerized by the use of the above mentioned sulfur type radical polymerization initiator to synthesize a polymer initiator having a dithiocarbamate group at the polymer terminal end.

Second step: By the use of the polymer initiator synthesized in the first step, a second vinyl monomer is polymerized to form a block copolymer. Here, the dithiocarbamate at the polymer terminal end is decomposed to become a radical initiation site (as described in detail below).

In such two steps, the fluorine-containing monomer can be used as the first monomer and the resin-affinitive vinyl monomer as the second monomer. Alternatively, the resin-affinitive vinyl monomer can be used as the first monomer and the fluorine-containing monomer as the second monomer.

In the case of conducting photopolymerization through the first step and the second step, the polymerization system should be preferably maintained at a temperature of 150° C. or lower from the standpoint of protection of dithiocarbamate group.

When photopolymerization is employed in these steps, the polymerization system may be either homogeneous or heterogeneous, provided that sufficient light energy for dissociation can be transmitted to the initiation site. Usually, however, bulk polymerization or solution polymerization is used in the first step, while in the second step solution polymerization or polymerization in a solution having the polymer initiator dissolved in the second monomer is used.

The molecular weight of each component of the block copolymer can be controlled by the molar ratio of the initiator to the monomer. For example, when 1 mol % of benzyl N,N-diethyldithiocarbamate is added to methyl methacrylate with a molecular weight as a monomer of 100, the number average molecular weight will be about 10,000 and the weight average molecular weight about 20,000. In the case of 0.1 mol %, they will be about 100,000 and about 200,000, respectively.

Similarly, in the second step, the molecular weight can be controlled by the molar ratio of the polymer initiator to the second monomer.

A suitable block copolymer has a weight average molecular weight of about 5,000 to 100,000 and contains 5 to 75% by weight of a fluorine-containing block. If the weight average molecular weight of the block copolymer is less than 5,000, it is easy to bleed out from a polymeric material, whereby the life of the effect is not sufficient. On the other hand, if it is over 100,000, the diffusion speed of the block copolymer onto the surface is small, whereby it is not adequately migrated onto the surface of the blend and its water repellent and oil repellent effects are not satisfactory.

If the content of the fluorine-containing block is less than 5% by weight in the block copolymer, the water repellent and oil repellent chain cannot sufficiently cover the whole surface of the blend, whereby water repellent and oil repellent effects are not satisfactory. On the other hand, if the content of the water repellent and oil repellent chain exceeds 75% by weight, the content of the resin-affinitive chain should become relatively smaller, whereby the affinity of the block copolymer for the polymeric material is not sufficient to cause poor dispersion.

Modification of surface characteristics

Modification of surface characteristics according to the present invention may be effected by compounding the specific block copolymer with a polymeric material. As a method for compounding, there may be employed a method in which a solution or dispersion of the specific block copolymer in a solvent is applied on the surface of a polymeric material, a method in which the block copolymer is compounded with a polymeric material during molding of the material, a method in which a film is formed after dissolving a polymeric material and the block copolymer in a solvent, a method in which the block polymer is formed into a sheet and pressurized under heating or adhered with an adhesive onto the surface of a polymeric material surface, or a method in which the block copolymer in the form of powder is attached by melting onto the surface of a polymeric material. Among such methods, preferred ones are those in which the block copolymer and the objective polymeric material are combined via their dissolved or melted state.

The amount of the block copolymer to be compounded may be 0.01 to 30 parts by weight, preferably 0.1 to 10 parts by weight, based on 100 parts by weight of a polymeric material. If the amount is less than 0.01 part by weight, the effect according to present invention will be insufficient, while characteristics inherent in a polymeric material may be deteriorated if it is in excess of 30 parts by weight. The block copolymer of the present invention may be added alone to a polymeric material to be modified, or it may be used in combination with a known fluorine-containing surfactant. The amount of such fluorine-containing surfactant used is preferably 0 to 50% by weight based on the block copolymer according to the present invention. If the amount is larger than 50% by weight, the effects of the present invention will be impaired.

The polymeric material with its surface being modified is preferably in its molded form.

EXAMPLES

The following examples are to illustrate some embodiments of the present invention without implying a limitation.

All parts and % in the examples are based on weight.

REFERENCE EXAMPLE 1

(A) Synthesis of polymer initiator:

Apparatus: In a thermostat tank with an inner temperature of 50° C., a vessel of 200 ml volume with a diameter of 3 cm made of Pyrex glass was positioned at a distance of 10 cm from a UV-ray lamp with an output of 400W (H400 PL, manufactured by Toshiba Denzai).

Monomers:

| | |
|---|---|
| Methyl methacrylate | 50 parts |
| Ethyl acrylate | 50 parts |
| Benzyl N,N-diethyl dithiocarbamate | 2.39 parts |

Polymerization operation: The above monomers were charged into the above vessel, and the vessel was replaced with nitrogen and then sealed. Photopolymerization was carried out by irradiation of UV-ray for about 10 hours. The acrylic polymer initiator obtained was a pale yellow and transparent solid. The amount of residual monomers was 1.6% as the total amount of the both monomers. The number average molecular weight by GPC calculated on polystyrene (hereinafter abbreviated as $M_N$) was 9,800, and the weight average molecular weight calculated on polystyrene (hereinafter abbreviated as $M_W$) was 22,000.

(B) Synthesis of block copolymer:

40 parts of powder obtained by pulverizing the acrylic polymer initiator obtained in (A), 40 parts of

and 160 parts of methyl ethyl ketone were well mixed and dissolved, and the resultant solution was placed in the same apparatus as used in (A). After replacing the inside of the vessel with nitrogen, photopolymerization was carried out by irradiation of UV-ray for about 10 hours to obtain a translucent white polymer dispersion. Thereafter a composition was reprecipitated with methanol and dried, and extraction operation with the use of acetone, etc. was repeated to obtain 66 parts of a block copolymer. The block copolymer formed had an $M_N$ of 21,000, an $M_W$ of 45,000, and the total amount of the residual monomers was less than 1%.

REFERENCE EXAMPLE 2

Into a reactor equipped with a thermometer, a stirrer and a reflux condenser were charged:

| | |
|---|---|
| methyl methacrylate | 50 parts |
| ethyl acrylate | 50 parts |
| benzoyl peroxide | 2 parts |
| methyl ethyl ketone | 200 parts | and after replacing the inside of the vessel with nitrogen, reaction was carried out by heating at 70° C. for 6 hours to obtain a colorless acrylic paint solution with $M_N = 52,000$ and $M_W = 130,000$. The resin content in the solution was 33%.

EXAMPLES 1-3

The block copolymer synthesized in Reference Example 1 was added to the acrylic paint solution synthesized in the Reference Example 2, and the water repellency and oil repellency of the film formed were measured. The water repellency and oil repellency were measured after forming a film to a thickness after drying of 20μ on an iron plate treated with wash primer and then drying the film on air for 24 hours. Also, as a permanency test, the above test strip was dipped in distilled water at 25° C. for one week and then the water repellency and oil repellency were measured thereon.

The compositions and the results are shown in Table 1.

COMPARATIVE EXAMPLE 1

Film formation was effected in the same manner as in Examples 1-3 except for adding no block polymer synthesized in Reference Example 1.

The results are shown in Table 1.

TABLE 1

| | Formulated composition: Block copolymer/Resin content in paint solution | Water repellency[1] | Oil repellency[2] | Permanency Water repellency | Permanency Oil repellency |
|---|---|---|---|---|---|
| Example 1 | 1/100 | 120° | 68° | 118° | 65° |
| Example 2 | 0.1/100 | 105° | 50° | 102° | 48° |
| Example 3 | 5/100 | 120° | 68° | 118° | 65° |
| Comparative Example 1 | 0/100 | 72° | 3° | 69° | 1° |

Note:
[1] Contact angle of pure water at 25° C., relative humidity of 60%;
[2] Contact angle of n-decane at 25° C., relative humidity of 60%.

It is apparent from Table 1 that the addition of the specific block copolymer according to the present invention provides the paint film with improved water repellency, oil repellency and permanency as compared with those of the film obtained without addition of such block copolymer.

REFERENCE EXAMPLE 3

(A) Synthesis of polymer initiator:

Into the same apparatus as in Reference Example 1(A) were charged:

| styrene | 100 parts |
|---|---|
| benzyl N,N-diethyl dithiocarbamate | 2.39 parts, | and after replacing the inside of the vessel with nitrogen, the vessel was sealed, and then photopolymerization was conducted by irradiation of UV-ray for about 15 hours. The styrene polymer initiator obtained was a pale yellow transparent solid, with the residual styrene monomer being 1.5%. The polymer formed had an $M_N$ of 11,000 and an $M_W$ of 25,000.

(B) Synthesis of block copolymer:

Synthesis was carried out under the same conditions as in Reference Example 1(B), except for changing the acrylic polymer initiator in Reference Example 1(B) to the styrene polymer initiator. The block copolymer formed had an $M_N$ of 21,000 and an $M_W$ of 46,000, with the total amount of the residual monomers being less than 1%.

EXAMPLES 4-6

Polystyrene resin powder and the block copolymer obtained in Reference Example 3 were kneaded by an extruder with the proportions shown in Table 2 into a sheet, which was further press molded into a sheet with a thickness of 2 mm. The sheet underwent no coloration, and no bleeding was observed on the surface. Further, workability was good with the sheet.

A part of the sheet was nipped between Teflon films and further pressed at 150° C. for 2 hours into a sheet with a thickness of 1 mm.

On the two kinds of sheets thus prepared, water repellency, oil repellency and permanency were measured according to the same method as in Examples 1 to 3.

COMPARATIVE EXAMPLE 3

A sheet was prepared in the same manner as in Example 4 except for not using the block copolymer.

The water repellency and oil repellency of the sheet were measured according to the same method as in Example 4. The results are shown in Table 2.

TABLE 2

| | Formulated composition: | | | Permanency | |
|---|---|---|---|---|---|
| | Block copolymer Polystyrene resin | Water repellency | Oil repellency | Water repellency | Oil repellency |
| Example 4 | 10/100 | 101° | 66° | 99° | 64° |
| Example 5 | 5/100 | 100° | 65° | 97° | 63° |
| Example 6 | 1/100 | 98° | 64° | 95° | 63° |
| Comparative Example 2 | 0/100 | 92° | unmeasurable | 88° | unmeasurable |

Note:
The measurement conditions are the same as in Table 1.

It is apparent from Table 2 that the addition to the polystyrene resin of the specific block copolymer according to the present invention provides the surface of the sheet with improved water repellency, oil repellency and permanency as compared with those of the sheet obtained without use of the block copolymer.

What is claimed is:

1. An AB-diblock copolymer represented by the following formula (I):

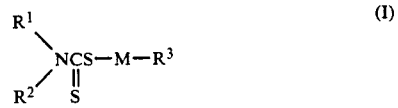

wherein $R^1$ represents a hydrocarbon group having 1 to 10 carbon atoms; $R^2$ represents a hydrogen atom or a hydrocarbon group having 1 to 10 carbon atoms; $R^3$ represents a benzyl group,

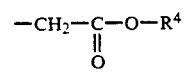

(wherein $R^4$ represents an alkyl group having 1 to 18 carbon atoms) or an alkyl group having 1 to 18 carbon atoms; M represents a group represented by the formula $(M^2)_m(M^1)_n$ or $(M^1)_m(M^2)_n$, each of m and n being a natural number of 20 to 5000; $M^1$ represents a (meth)acrylate residue represented by the formula:

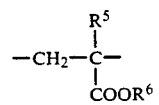

(wherein $R^5$ represents a hydrogen atom or a methyl group, and $R^6$ represents a hydrocarbon group having 1 to 18 carbon atoms or a hydrocarbon group having 1 to 18 carbon atoms substituted with an alkoxy group or a hydroxyl group) or an aromatic vinyl residue represented by the formula:

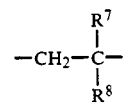

(wherein $R^7$ represents a hydrogen atom or a methyl group, $R^8$ represents a phenyl group or an alkylphenyl group) or a fatty acid vinyl ester residue represented by the formula:

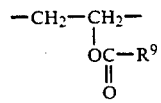

(wherein $R^9$ represents a hydrocarbon group having 1 to 18 carbon atoms); $M^2$ represents a fluorine-containing vinyl residue represented by the formulae (II) to (VI);

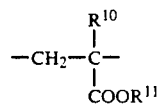

wherein R$^{10}$ represents a hydrogen atom, a methyl group, a fluorine atom or a fluorine-substituted alkyl group having 1 to 16 carbon atoms, and R$^{11}$ represents a fluorine-substituted alkyl group having 1 to 16 carbon atoms,

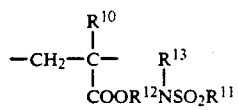

wherein R$^{10}$ and R$^{11}$ have the same meanings as those in the formula (II), R$^{12}$ represents an alkylene group having 1 to 10 carbon atoms and R$^{13}$ represents an alkyl group having 1 to 10 carbon atoms,

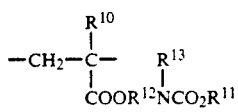

wherein R$^{10}$, R$^{11}$, R$^{12}$, R$^{13}$ have the same meanings as those in the formula (III),

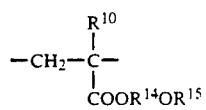

wherein R$^{10}$ have the same meaning as that in the formula (IV), R$^{14}$ is an alkylene group having 1 to 10 carbon atoms or a fluorine-substituted alkylene group having 1 to 10 carbon atoms, R$^{15}$ is an alkyl group having 1 to 10 carbon atoms or a fluorine-substituted alkyl group having 1 to 10 carbon atoms; at least one of R$^{10}$, R$^{14}$ and R$^{15}$ being required to contain fluorine,

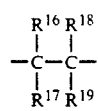

wherein R$^{16}$, R$^{17}$, R$^{18}$, R$^{19}$ each represent a hydrogen atom, a chlorine atom, a fluorine atom, a phenyl group, a substituted phenyl group, a fluorine-substituted alkyl group having 1 to 6 carbon atoms, at least one of R$^{16}$ to R$^{19}$ being required to contain fluorine.

2. The block copolymer according to claim 1, wherein the residue M$^1$ is formed from a (meth)acrylate monomer selected from the group consisting of methyl (meth)acrylate, ethyl (meth)acrylate, n-butyl (meth)acrylate, isobutyl (meth)acrylate, hexyl (meth)acrylate, isooctyl (meth)acrylate, 2-ethylhexyl (meth)acrylate, isononyl (meth)acrylate, decyl (meth)acrylate, stearyl (meth)acrylate, hydroxyethyl (meth)acrylate, 2-methoxyethyl (meth)acrylate, 2-ethoxyethyl (meth)acrylate, 2-butoxyethyl (meth)acrylate, (meth)acrylic acid pentaethylene glycol monomethyl ether, (meth)acrylic acid diethylene glycol monoethyl ether and (meth)acrylic acid diethylene glycol monobutyl ether.

3. The block copolymer according to claim 1, wherein the residue M$^1$ is formed from an aromatic vinyl monomer selected from the group consisting of styrene, p-methylstyrene, o-methylstyrene, α-methylstyrene and β-methylstyrene.

4. The block copolymer according to claim 1, wherein the residue M$^1$ is formed from an aliphatic vinyl ester monomer selected from the group consisting of vinyl acetate, vinyl propionate, vinyl butyrate, vinyl caproate, vinyl 2-ethylhexanoate, vinyl laurate and vinyl stearate.

5. The block copolymer according to claim 1, wherein the residue M$^2$ is formed from a fluorine-containing vinyl monomer selected from the group consisting of:

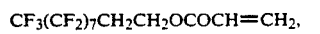

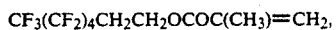

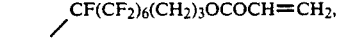

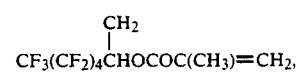

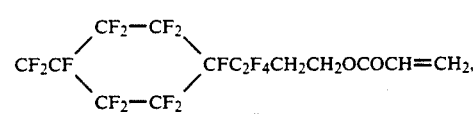

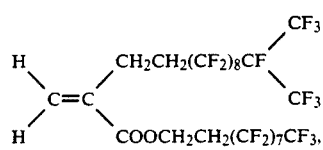

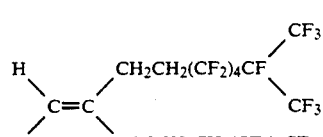

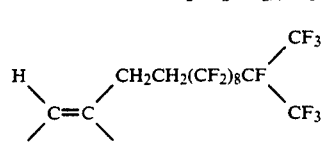

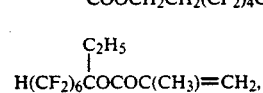

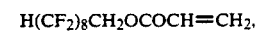

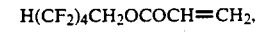

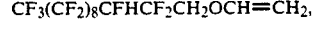

and

-continued

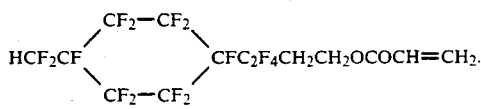

6. The block copolymer according to claim 1, wherein the residue $M^2$ is formed from a fluorine-containing vinyl monomer selected from the group consisting of:

$$CF_3(CF_2)_7SO_2N(CH_3)CH_2CH_2OCOC(CH_3)=CH_2,$$

$$CF_3(CF_2)_7SO_2N(CH_3)CH_2CH_2OCOCH=CH_2,$$

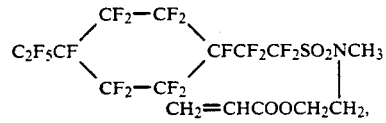

$$C_8F_{17}SO_2N(CH_3)(CH_2)_{10}OCOCH=CH_2,$$

$$C_2F_5SO_2N(C_2H_5)CH_2CH_2OCOC(CH_3)=CH_2,$$

$$C_8F_{17}SO_2N(CH_3)(CH_2)_4OCOCH=CH_2,$$

$$C_2F_5SO_2N(C_3H_7)CH_2CH_2OCOC(CH_3)=CH_2,$$

$$C_2F_5SO_2N(C_2H_5)C(C_2H_5)HCH_2OCOCH=CH_2.$$

and

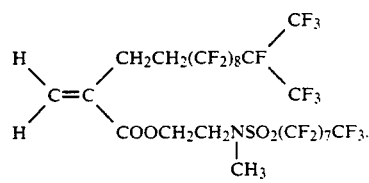

7. The block copolymer according to claim 1, wherein the residue $M^2$ is formed from a fluorine-containing monomer selected from the group consisting of:

$$C_7F_{15}CON(C_2H_5)CH_2OCOC(CH_3)=CH_2,$$

$$C_2F_5CON(C_2H_5)CH_2OCOCH=CH_2,$$

$$CF_3(CF_2)_2CON(CH_3)CH(CH_3)CH_2OCOCH=CH_2,$$

$$CH_3(CF_2)_7CON(CH_2CH_2CH_3)CH_2CH_2OCOC(CH_3)=CH_2,$$

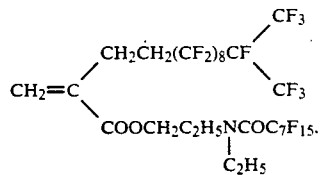

and

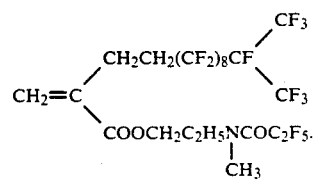

8. The block copolymer according to claim 1, wherein the residue $M^2$ is formed from a fluorine-containing monomer selected from the group consisting of:

$$CF_3CH_2OCH_2CH_2OCOCH=CH_2,$$

$$HCF_2CF_2OCH_2CH_2OCOCH=CH_2,$$

$$C_2F_5(CH_3CH_2O)_2CH_2OCOCH=CH_2,$$

$$C_8F_{17}OCH_2CH_2OCOC(CH_3)=CH_2,$$

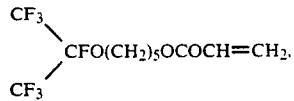

$$CF_3(CF_2)_4OCH_2CH_2OCOC(CH_3)=CH_2,$$

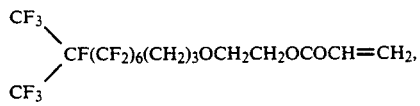

and

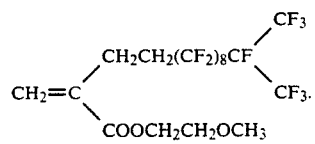

9. The block copolymer according to claim 1, wherein the residue $M^2$ is formed from a fluorine-containing monomer selected from the group consisting of: $CCl_2=CFCl$, $CFCl=CFCl$, $CF_2=CCl_2$, $CClF=CF_2$, $CF_2=CF_2$, $CHCl=CFCl$, $CHF=CCl_2$, $CHCl=CF_2$, $CHF=CClF$, $CHF=CF_2$, $CHF=CHCl$, $CH_2=CClF$, $CHF=CHF$, $CH_2=CF_2$, $CH_2=CFH$, $CF_2=C(CF_3)_2$, $CF_3-CF=CF_2$, $CF_3-CH=CHF$, $CF_3-CH=CH_2$, $C_3F_7(CH_3)C=CH_2$, $CF_3CF_2CF=C(CF_3)_2$, $(CF_3)_2CFCF=CF—CF_3$, and

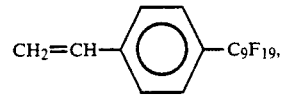

10. The block copolymer according to claim 1, wherein said block copolymer has a weight average molecular weight of about 5,000 to 100,000 and contains 5 to 75% by weight of a fluorine-containing block.

11. A polymer composition comprising a polymeric material and the block copolymer according to claim 1.

12. The polymer composition according to claim 11, wherein the amount of the block copolymer added is 0.01 to 30 parts by weight based on 100 parts by weight of the polymeric material.

13. A heterogeneous process for producing the block copolymer according to claim 1, comprising the steps of:

a first step of polymerizing either one of a monomer for forming $M_1$ block or a monomer for forming $M_2$ block in the presence of a sulfur-containing compound having the following formula (VII):

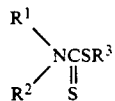

wherein $R^1$ represents a hydrocarbon group having 1 to 10 carbon atoms; $R^2$ represents a hydrogen atom or a hydrocarbon group having 1 to 10 carbon atoms; $R^3$ represents a benzyl group,

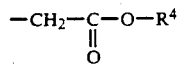

(wherein $R^4$ represents an alkyl group having 1 to 18 carbon atoms), or an alkyl group having 1 to 18 carbon atoms; so as to synthesize a polymer initiator having 20 to 5,000 monomer units and a dithiocarbamate group at the polymer terminal end; and a second step of polymerizing the other monomer in the presence of said polymer initiator obtained in the first step; wherein polymerizations in the first step and the second step are carried out with the irradiation of ultraviolet rays and wherein polymerization of the fluorine-containing monomer is carried out in a heterogeneous medium.

14. The process of claim 13 wherein the second step is polymerization of a fluorine-containing vinyl residue which is sparingly soluble in the reaction solvent.

* * * * *